(12) United States Patent
Lund et al.

(10) Patent No.: US 9,948,880 B2
(45) Date of Patent: Apr. 17, 2018

(54) ASYNCHRONOUS MULTIMODE FOCAL PLANE ARRAY (71) Applicant: Sensors Unlimited, Inc., Princeton, NJ (US)

(72) Inventors: Joshua Lund, Dallas, TX (US); Samuel Bagwell, Pasadena, CA (US); David Estrada, Sherman Oaks, CA (US); Wilson Law, Temple City, CA (US)

(73) Assignee: Sensors Unlimited, Inc., Princeton, NJ (US)

( * ) Notice: Subject to any disclaimer, the term of this patent is extended or adjusted under 35 U.S.C. 154(b) by 0 days.

(21) Appl. No.: 15/226,822

(22) Filed: Aug. 2, 2016

(65) Prior Publication Data

US 2018/0041727 A1 Feb. 8, 2018

(51) Int. Cl.
*H04N 5/378* (2011.01)
*H04N 5/235* (2006.01)
(Continued)

(52) U.S. Cl.
CPC ........... *H04N 5/378* (2013.01); *H04N 5/2353* (2013.01); *H04N 5/332* (2013.01); *H04N 7/0127* (2013.01)

(58) Field of Classification Search
CPC ...... H04N 5/378; H04N 5/332; H04N 7/0127; H04N 5/2353
See application file for complete search history.

(56) References Cited

U.S. PATENT DOCUMENTS 6,864,965 B2    3/2005   DeFlumere
7,608,823 B2   10/2009   Tennant
(Continued)

OTHER PUBLICATIONS

Fraenkel, R.; Berkowicz, E.; Bykov, L.; Dobromislin, R.; Elishkov, R.; Giladi, A.; Grimberg,I.; I. Hirsh, E. Ilan, C. Jacobson, I. Kogan, P. Kondrashov, P.; Nevo, I.; Pivnik, I. and Vasserman, S.: *High Definition 10pm pitch in GaAs detector with Asynchronous Laser Pulse Detection Mode*; SemiConductor Devices, P.O. Box 2250, Haifa 31021, Israel; Infrared Technology and Applications XLII, edited by Bjorn F. Andresen, Gabor F. Fulop, Charles M. Hanson, Paul R. Norton, Proc. of SPIE vol. 9819, 981903, © 2016 SPIE, CCC code: 0277-786X/16/$18, doi: 10.1117/12.2222762. Proc. of SPIE vol. 9819 981903-1.

Fraenkel, R.; Aronov, D.; Benny, Y.; Berkowicz, E.; Bykov, L.; Calahorra, Z.; Fishman, T; Giladi, A.; Ilan,E.; Klipstein, P.; Langof, L.; Lukomsky, I.; Mistele, D.; Mizrahi, U.; Nussinson, D.; Twitto, A.; Yassen, M. and Zemel, A.: *SCD's Cooled and Uncooled Photo Detectors for NIR-SWIR*, SemiConductor Devices P.O. Box 2250, Haifa 31021, Israel, Faculty of Electrical Engineering, Technion, IMOD.

Shkedy, L.; Rai Fraenkel, R.; Fishman, T.; Giladi, A.; Bykov, L.; Grimberg, I.; Ilan, E.; Vasserman, S. and Alina Koifman, A: *Multi-function InGaAs detector with on-chip signal processing*, SemiConductor Devices P.O. Box 2250, Haifa 31021, Israel.

(Continued)

*Primary Examiner* — Jason A Flohre
(74) *Attorney, Agent, or Firm* — Locke Lord LLP; Scott D. Wofsy; Judy R. Naamat (57) ABSTRACT

A multimode pixel of a pixel array is provided. The multimode pixel includes a photodetector, an image sensing circuit, a pulse detection circuit, and an image readout path coupled between the image sensing circuit and at least one readout conductor of the pixel array to transmit image signals from the image sensing circuit to the at least one readout conductor. The multimode pixel further includes a pulse readout path different from the image readout path, wherein the pulse readout path is coupled between the pulse detection circuit and the at least one readout conductor to transmit pulse data from the pulse detection circuit to the at least one readout conductor, and wherein the image readout path is controlled independently from the pulse readout path.

10 Claims, 5 Drawing Sheets (51) Int. Cl.
*H04N 5/33* (2006.01)
*H04N 7/01* (2006.01)

(56) References Cited

U.S. PATENT DOCUMENTS

| | | | |
|---|---|---|---|
| 8,581,168 B2 | 11/2013 | Linder et al. | |
| 8,829,404 B1 | 9/2014 | Rinker | |
| 9,052,381 B2 | 6/2015 | Woolaway et al. | |
| 9,207,053 B2 | 12/2015 | Ell et al. | |
| 9,215,386 B2 | 12/2015 | Elkind et al. | |
| 2008/0001065 A1* | 1/2008 | Ackland | H04N 5/3559 250/208.1 |
| 2010/0140732 A1* | 6/2010 | Eminoglu | H04N 5/3745 257/447 |
| 2010/0194956 A1* | 8/2010 | Yuan | H04N 5/35527 348/308 |
| 2012/0248288 A1* | 10/2012 | Linder | H04N 5/2256 250/208.1 |
| 2012/0261553 A1* | 10/2012 | Elkind | H04N 5/335 250/208.1 |
| 2015/0268345 A1 | 9/2015 | Ell | |
| 2016/0057366 A1* | 2/2016 | Lee | H04N 5/3742 348/302 |
| 2016/0293647 A1* | 10/2016 | Lin | H01L 27/14609 |
| 2016/0295148 A1* | 10/2016 | Lin | H04N 5/3765 |

OTHER PUBLICATIONS

Shkedy, L.; Koifman, A.; Giladr, A.; Tuito, A.; Ilarr, E.; Grimberg, I.; Hirsh, I.; Bykov, L.; Elishkov, R.; Fraenkel, R. and Vassermanm, S.: *Multi-Function InGaAs Detector for SWIR Imaging*, OPTRO-2014-2930312 , SemiConductor Devices P.O. Box 2250, Haifa 31021, Israel; Israel MOD.

Langof, L.; Nussinson, D. Ilan, E.; Elkind, S.; Dobromislin, R.; Nevo, I.; Khinich, F.; Labilov, M.; Calahorra, Z.; Vaserman, S.; Markovitz, T.; Twitto, A.; Oster, D.: *Multi-function IR detector with on-chip signal processing*, SemiConductor Devices, P.O. Box 2250, Haifa 31021, Israel , Email: lidia_langof@scd.co.il; Israeli Ministry of Defence (IMOD), Israel, Email: avit000@gmail.com <mailto:avit000@gmail.com>.

Langof, L.; Nussinson, D. Ilan, E.; Elkind, S.; Dobromislin, R.; Nevo, I.; Khinich, F.; Labilov, M.; Calahorra, Z.; Vaserman, S.; Markovitz, T.; Manelaa, O.; Elooz, D.; Twitto, A.; Oster, D.: *Advanced multi-function infrared detector with on-chip processing*, SemiConductor Devices, P.O. Box 2250, Haifa 31021, Israel, Elbit Systems, Electro-Optics El-Op Ltd. P.O. Box1165, Rehovot 76111, Israel; Israeli Ministry of Defence (IMOD), Israel.

\* cited by examiner

ASYNCHRONOUS MULTIMODE FOCAL PLANE ARRAY

BACKGROUND OF THE DISCLOSURE

1. Field of the Invention

The present disclosure relates to a focal plane array, and more particularly to a focal plane array that operates in a first mode for low-frequency imaging and in a second mode for high-frequency laser detection.

2. Description of Related Art

A shortwave infrared (SWIR) focal-plane array (FPA) includes an array of IR-sensitive sensing devices (referred to as photodetectors) and a readout integrated circuits (ROIC) chip having an array of ROIC pixel and readout pixel circuits. The IR photodetectors generate an electrical charge, voltage, or resistance in response to detecting photons in the IR wavelengths. The magnitude of the photodetector output is proportional to the number of photons detected by the photodetector.

The output of each photodetector is received and processed in a corresponding readout pixel circuit of the ROIC. Although the photodetector and the corresponding ROIC circuit in the ROIC chip can be disposed on different substrates, the photodetector and the corresponding ROIC readout pixel circuit are referred to as a pixel.

A multimode SWIR camera can be used for imaging and laser pulse detection. In laser pulse detection mode, a laser designator that includes a laser light source designates targets by directing a coded laser signal at the targets. Laser designator signals are generally very short duration laser pulses (e.g. less than 100 ns) repeated at some fixed frequency, the fixed repetition frequency representing the laser's code. A coded laser signal can be reflected off of the targets and used to identify the target. In multimode applications, it is desirable to simultaneously sense an image representing a background scene and detect coded laser pulses at locations within that scene.

However, image signals are composed of relatively low frequencies and are processed at a relatively low frame rate, whereas the laser signal pulse shapes have relatively high-frequencies and accurate decoding of their repetition rates demands high frame rates. In order to process both low and high frequency signals, conventional SWIR cameras have generally performed only one of high frequency signal detection or low frequency imaging at a given time.

More recent multimode SWIR cameras have used different pixel circuits for acquiring and/or processing the image signals and the laser signals. Some multimode SWIR cameras have been configured to include multimode pixels that share one or more components for acquiring and/or processing the image signals and the laser signals at a cost of interdependence that can limit flexibility regarding processing the image and laser signals in different ways.

While conventional methods and systems have generally been considered satisfactory for their intended purpose, there is still a need in the art for pixels that can process image and laser signals independently from one another. The present disclosure provides a solution for this problem.

SUMMARY OF THE INVENTION

In accordance with an aspect of the disclosure, a multimode pixel of a pixel array is provided. The multimode pixel includes a photodetector, an image sensing circuit, a pulse detection circuit, and an image readout path coupled between the image sensing circuit and readout conductor(s) of the pixel array to transmit image signals from the image sensing circuit to the at least one readout conductor. The multimode pixel further includes a pulse readout path different from the image readout path, wherein the pulse readout path is coupled between the pulse detection circuit and the readout conductor(s) to transmit pulse data from the pulse detection circuit to the at least one readout conductor, and wherein the image readout path is controlled independently from the pulse readout path.

In embodiments, the readout conductor(s) can include an image readout conductor to receive image signals from the image sensing circuit and a pulse readout conductor that can be independent of the image readout conductor, wherein the pulse readout conductor can receive pulse data from the pulse detection circuit. The image readout path can be coupled to only the image readout conductor of the at least one readout conductor, and the pulse readout path can be coupled to only the pulse readout conductor of the at least one readout conductor.

In embodiments, the image readout path can be controlled independently from the pulse readout path for asynchronous operation of the image and pulse readout paths. The image sensing circuit and the pulse detection circuit can share at least one electronic device.

In accordance with further aspects of the disclosure, a readout integrated circuit (ROIC) is provided. The ROIC includes an image readout conductor, a pulse readout conductor that is independent of the image readout conductor, and an array of readout circuits, wherein each readout circuit is associated with a respective pixel of the pixel array, and each pixel of the array includes a photodetector. Each readout circuit includes an image sensing circuit, an image readout path, a pulse detection circuit, and a pulse readout path, wherein the pulse readout path is independent of the image readout path. The image readout path is coupled between the pixel's image sensing circuit and the image readout conductor to transmit image signals from the image sensing circuit to the image readout conductor. The pulse readout path is coupled between the pixel's pulse detection circuit and the pulse readout conductor to transmit pulse data from the pulse detection circuit to the pulse readout conductor.

In embodiments, the ROIC can further include an image controller that can control the image readout path, and a pulse controller that can control the pulse readout path and can operate independently from the image controller.

In embodiments, the image control signal and pulse control signals can include, respectively, an image row select signal and a pulse row select signal, or an image reset signal and a pulse reset signal. The image row select signal can enable readout along the image readout path and the pulse row select signal can enable readout along the pulse readout path. The image reset signal can reset the image sensing circuit, and the pulse reset signal can reset the pulse detection circuit.

In further embodiments, the image signals transmitted to the image readout conductor can be analog signals, and the pulse data transmitted to the pulse readout conductor can be at least one of binary and digital.

Additionally, in embodiments, the pulse controller can further select at least one subset of the pulse data output by the pulse detection circuit to be transmitted to the pulse readout conductor, wherein each subset can be included in a respective pulse detection sub-window.

In embodiments, the pulse controller can further control a first frame rate at which a first pulse detection sub-window are output to the pulse readout conductor and a second frame rate, different than the first frame rate, at which a second pulse detection sub-window are output to the pulse readout conductor.

In further embodiments, the image controller can further control a first frame rate at which the image signals are output to the image readout conductor, and the pulse controller further can control a second frame rate at which the pulse data are output to the pulse readout conductor. The pulse controller can control the second frame rate asynchronously from the image controller controlling the first frame rate.

Furthermore in embodiments, the image controller can receive an image exposure control signal that controls framing of the image signals and the pulse controller can receive a pulse exposure control signal that controls framing of the pulse data. The image and pulse exposure control signals can be received from different sources and timed independently of one another.

In still a further aspect of the disclosure, a method of controlling image signal and pulse data readout from a ROIC is provided. The method includes controlling transmission of image signals from individual pixels of a pixel array to at least one readout conductor, and controlling, asynchronously to transmission of the image signals, transmission of pulse data from the individual pixels of the pixel array to the at least one readout conductor.

In embodiments, controlling transmission of the image signals can include controlling transmission of the image signals along individual image readout paths between respective image sensing circuits of the pixel array and the at least one readout conductor, and controlling transmission of the pulse data can include controlling transmission of the pulse data along individual pulse readout paths between respective pulse detection circuits of the pixel array and the at least one readout conductor.

In further embodiments, the method can further include selecting at least one subset of the pulse data output by the pixel array to be transmitted to the at least one readout conductor, wherein each subset can be included in a respective pulse detection sub-window.

In addition, in embodiments, the method can further include controlling a frame rate at which each pulse detection sub-window is output to the at least one readout conductor.

Furthermore, in embodiments, the method further can further include controlling a first frame rate at which a first pulse detection sub-window is output to the readout conductor(s) and a second frame rate, different than the first frame rate, at which a second pulse detection sub-window is output to the readout conductors.

In embodiments, the method can further include controlling a first frame rate at which the image signals are output to the at least one readout conductor, and controlling a second frame rate at which the pulse data are output to the at least one readout conductor. The second frame rate can be controlled asynchronously from controlling the first frame rate.

In embodiments, the pulse data transmitted to the readout conductor(s) can be at least one of binary and digital.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
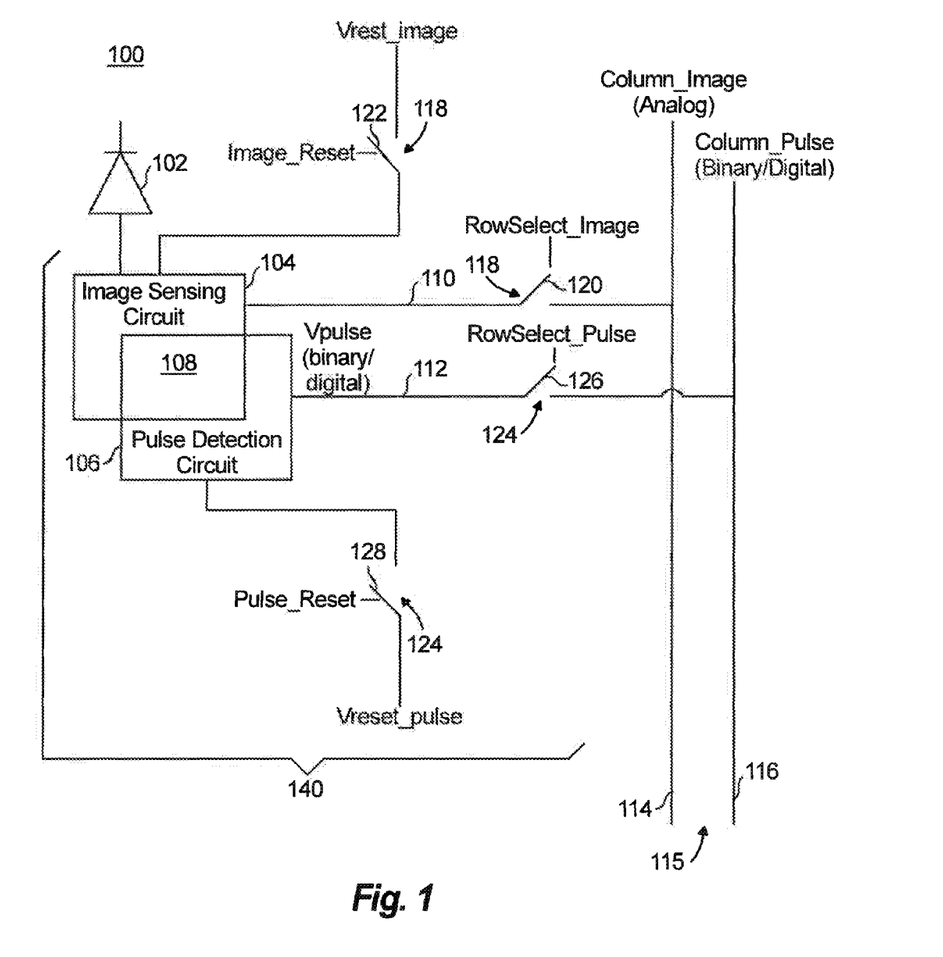
FIG. 1 shows a schematic diagram of an exemplary embodiment of a multimode pixel for multimode sensing of image and laser signals in accordance with embodiments of the present disclosure.

Reference will now be made to the drawings wherein like reference numerals identify similar structural features or aspects of the subject disclosure. For purposes of explanation and illustration, and not limitation, a schematic diagram of an exemplary embodiment of a multimode pixel for multimode sensing in accordance with the disclosure is shown in FIG. 1 and is designated generally by reference character 100. Other embodiments of a multimode pixel in accordance with the disclosure, or aspects thereof, are provided in FIGS. 2-5, as will be described.

As described in greater detail below, the multimode pixel 100 is included in a multimode focal plane (FPA) array that has multimode capabilities for both pulse detection and imaging one example application of a multimode FPA is a SWIR camera used for detecting laser pulses emitted by military laser designators and reflected from targets. Other applications for cameras that acquire images and detect short duration, high frequency light impulses are also envisioned. While the disclosure is directed to an example that uses laser pulse detection in a SWIR camera, the disclosure is not limited to this application.

Laser signals emitted by a laser source for laser designation can have a wavelength visible in the shortwave infrared band. High spatial resolution pulse data output is needed in order to correlate these relatively small detected laser pulses, which are usually only a few pixels in diameter, with objects in a relatively large imaged scene. Additionally, high temporal resolution pulse data output is needed to capture and decode high-frequency pulses in the laser signal sensed by the photodetector, wherein the laser signal can have pulse widths on the order of tens of nanoseconds. The decoding accuracy of the pulse repetition frequency (PRF) of the laser source is limited by temporal resolution of pulse data output by the respective multimode pixels; a required temporal time of arrival resolution may be on the order of tens of microseconds. The temporal resolution is at least partially defined by a frame rate for reading out pulse data by the individual pixels and the rate at which a readout path for reading out the pulse data can be reset.

On the contrary, imaging performed by the SWIR camera is a slower process. The photodetector output is integrated over time to achieve a desired signal to noise ratio, which sets a practical rate at which image signals are desired to be readout. Accordingly, temporal resolution for imaging can be lower than the temporal resolution needed for laser pulse detection. It follows that a frame rate for reading out pulse data by the individual pixels and the rate at which readout of the readout path for reading out the image signals can be lower than for laser pulse detection.

Accordingly, the multimode pixel 100 can be included in a pixel array of a camera that is used for acquiring images and detecting laser designation signals. The camera can be, for example, a shortwave infrared (SWIR) camera that can be used to detect, track, and decode laser signals, which are commonly of a wavelength visible in the shortwave infrared band. Alternatively, the multimode pixel 100 can also be used to detect high frequency events generated by a laser of a non-SWIR wavelength or emitted by other emitters of high frequency pulse energy with short pulse durations. The multimode pixel 100 can be used in a sensor array that detects ultraviolet, visible, or midwave illumination or other received electromagnetic signals, such as x-rays.

The multimode pixel 100 includes a photodetector 102, which is an IR-sensitive sensing device that outputs photocurrent in response to excitation by photons in IR wavelengths. The infrared-sensitive materials can include, for example, mercury cadmium telluride (HgCdTe, "MerCad", or "MerCadTel"), indium antimonide (InSb, pronounced "Inns-Bee"), indium gallium arsenide (InGaAs, pronounced "Inn-Gas"), and vanadium (V) oxide (VOx, pronounced "Vox"). Alternatively, photodetector element 102 could represent any type of detector that generates current in response to a form of input signal that has sufficient bandwidth to convert an input signal to a current for input signal pulses between 1 ns and 1000 ns in duration.

The output from the photodetector 102 is received and processed by an image sensing circuit 104 and a pulse detection circuit 106. In embodiments, the image sensing circuit 104 and pulse detection circuit 106 can share one or more electrical devices (e.g., an amplifier, transistor, and/or capacitor), as indicated by the overlapping portion 108. In other embodiments, the image sensing circuit 104 and pulse detection circuit 106 are independent of one another and do not share any electrical devices, such that overlapping portion 108 would be nil (e.g., empty). The image sensing circuit 104 outputs image signals (Vimage) along an image readout path 110 to at least one readout conductor 115. The pulse detection circuit 106 outputs pulse data (Vpulse) along a pulse readout path 112 to the at least one readout conductor 115.

The readout conductors 115 and the image and pulse 110, 112 readout paths traverse the array of multimode pixels 100 in two respective, different directions so that each multimode pixel 100 is traversed by an image readout path 110 and a pulse readout path 112 which are oriented in a first direction (shown in the example as horizontal). The multimode pixel 100 is also traversed by a set of one or more readout conductors 115 which are oriented in a second direction (shown in the example as vertical). Thus, the image and pulse readout paths 110, 112 and the sets of one or more readout conductors 115 traverse the array in two different directions, such as horizontal rows and vertical columns. The configuration of readout paths 110, 112 and readout conductors 115 is not limited to rows and columns. Other configurations can be used, such as with readout paths oriented in circular paths, with the readout conductors oriented in radial paths.

The image sensing circuit 104 includes electrical devices that are configured to receive relatively low frequency signals included in the photodetector output and output corresponding image signals. Charge or current output by the photodetector 102 is integrated to produce an analog voltage. The integration time (time required for integration) limits a rate at which image signals are allowed to be readout from the pixel 100. Accordingly, a frame rate for outputting the image signals is relatively low. Conventional image frame rates are 30 frames/msec, 60 frames/msec and 120 frames/msec.

The pulse detection circuit 106 includes electrical devices are configured to detect relatively high frequency signals included in the photodetector output and output a corresponding binary pulse detection data. A rate at which charge or current output by the photodetector 102 can be processed is not limited by integration time and can be faster than the rate used by the image sensing circuit 104. Accordingly, a useful frame rate for reading out the pulse data may be high relative to the image frame rate.

The pixel 100 includes electronic components that can be disposed in different arrays. Each array can be disposed on a respective substrate. The photodetector 102 can be included in an array of photodetectors, wherein each photodetector corresponds to a respective pixel. The remaining circuits and components of the pixel 100 (except for the photodetector 102) and the readout conductors 115 are included in a readout circuit 140, wherein the readout circuit 100 can be included in an array of readout circuits and included in an integrated chip as a readout integrated chip (ROIC). Each readout circuit of the readout circuit array corresponds to a respective pixel. Accordingly, pixel 100 includes a photodetector 102 of the photodetector array and a readout circuit 140 that corresponds to the photodetector 102, wherein the readout circuit 140 is included in the ROTC.

In embodiments, the at least one readout conductor 115 includes an image readout conductor 114 and a pulse readout conductor 116. The image readout conductor 114 is coupled to the image readout path 110 and receives the image signals. The pulse readout conductor 116 is coupled to the pulse readout path 112 and receives the pulse data. The image signals are analog signals and the pixel signals are binary or digital signals.

The image readout path 110 is controlled by at least one switch 118. In the example shown, the at least one switch 118 includes an image row select switch 120 that responds to an image row select control signal (RowSelect_Image) and an image reset switch 122 that responds to an image reset control signal (Image_Reset) and is biased by an image reset bias voltage (Vreset_Image). The pulse readout path 112 is controlled by at least one switch 124. In the example shown, the at least one switch 124 includes a pulse row select switch 126 that responds to a pulse row select control signal (RowSelect_Pulse) and a pulse reset switch 128 that responds to a pulse reset control signal (Pulse_Reset) and is biased by a pulse reset bias voltage (Vreset_pulse).

The image row select switch 120 controls transmission of image signals via the image readout path 110, such that when the image row select switch 120 is closed image signals are transmitted from the image sensing circuit 104 to the image readout conductor 114. The image reset switch 122 controls resetting of the image sensing circuit 104, wherein resetting image sensing circuit 104 removes any charge or voltage that might reside on the image sensing circuit 104 and be output on the image readout path 110.

The pulse row select switch 126 controls transmission of pulse data via the pulse readout path 112, such that when the pulse row select switch 126 is closed, pulse data are transmitted from the pulse detection circuit 106 to the pulse readout conductor 116. The pulse reset switch 128 controls resetting of the pulse detection circuit 106, wherein resetting the pulse detection circuit 106 removes any charge or voltage that might reside on the pulse detection circuit 106 and be output on the pulse readout path 110.

Switches 120, 122, 126, 128 can include a circuit and/or electronic components, such as transistors, that open or close in response to a control signal to enable or reset a readout path.

Figure 2:
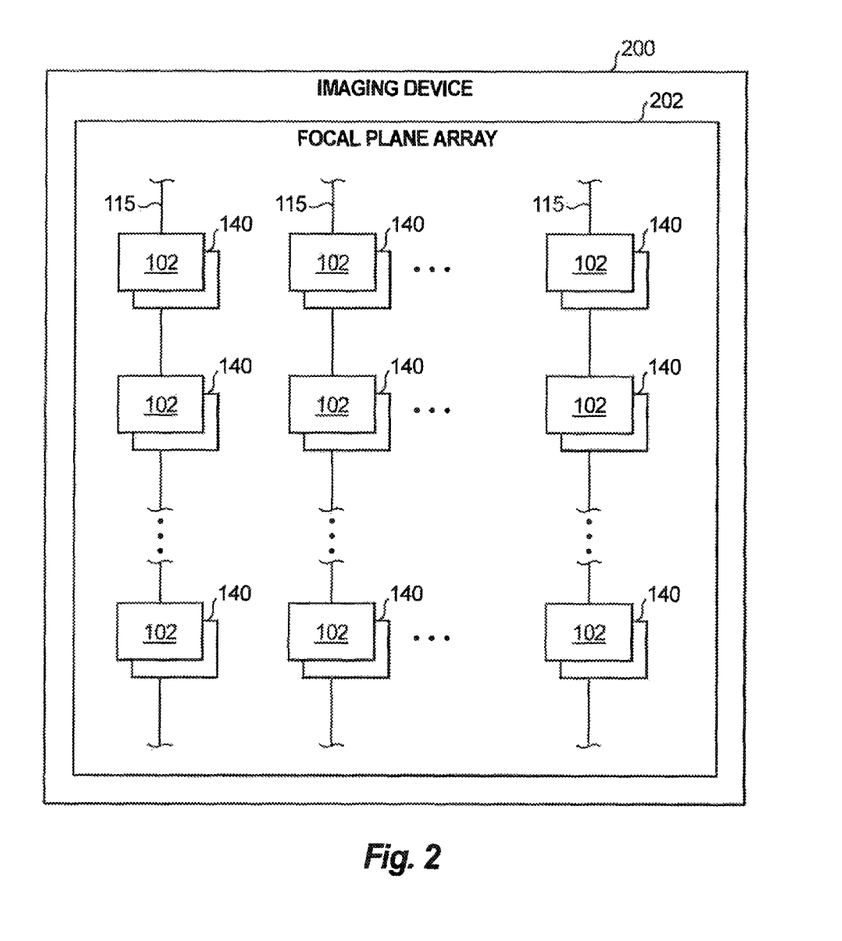
FIG. 2 shows a schematic diagram of an imaging device in accordance with embodiments of the present disclosure.

With reference to FIG. 2, a schematic drawing of an example imaging device 200 is shown. The imaging device 200 includes a focal plane array (FPA) 202. The FPA 202 includes an array of photodetectors 102 and an array of readout circuits 140, with at least one readout conductor 115 coupled to a line (e.g., column) of readout circuits 140. The imaging device 200 can further include optics, row and column drivers, decoders, signal processing circuits, and image processing circuits (not shown). Further, the imaging device 200 can include one or more processing devices (not shown) that execute stored programmable instructions to control and/or perform functions of the imaging device 200.

Figure 3:
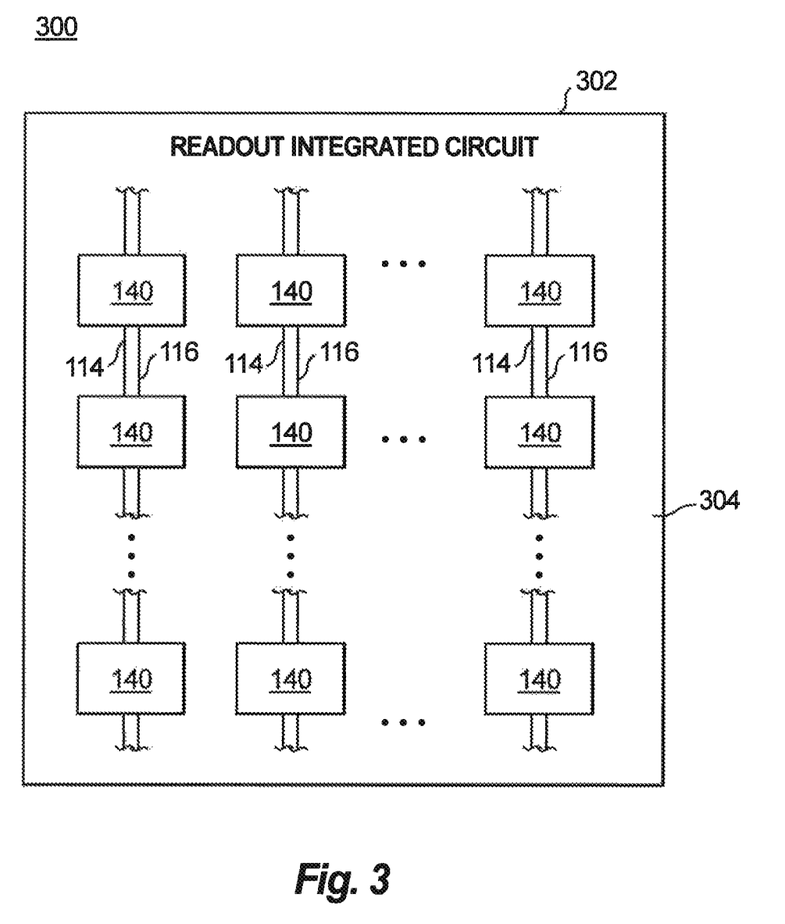
FIG. 3 shows a schematic diagram of a readout integrated circuit in accordance with embodiments of the present disclosure.

FIG. 3 is a schematic drawing of an exemplary chip 300 having ROIC 302. The ROIC 302, provided as an integrated circuit formed on substrate 304, includes the array of readout circuits 140 with image and pulse readout conductors 114, 116 traversing lines, e.g., columns, of the array of readout circuits 140. The ROIC 302 is incorporated into the FPA 202 so that each readout circuit 140 corresponds to a respective photodetector 102 of the photodetector array.

Figure 4:
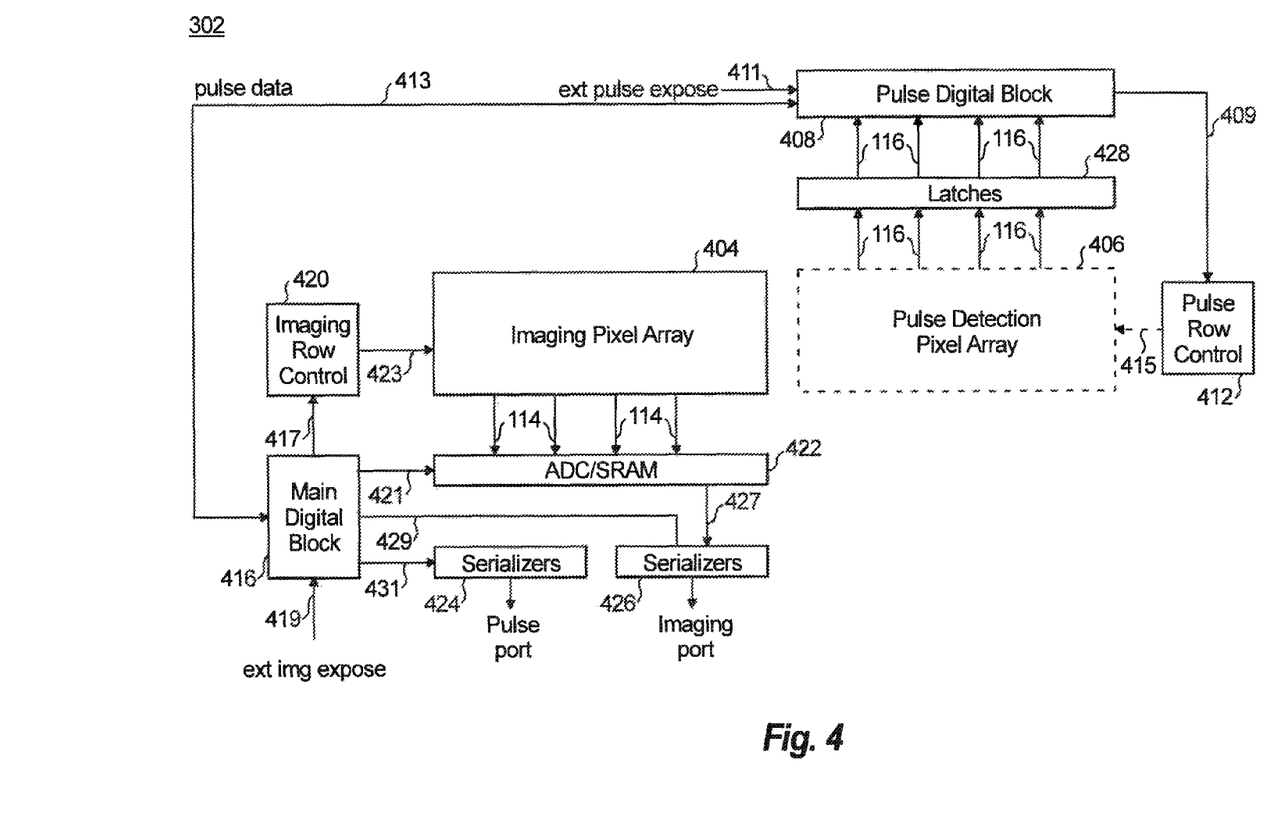
FIG. 4 is a conceptual diagram of a readout circuit of the readout integrated circuit shown in FIG. 3.

FIG. 4 is a conceptual block diagram of an example configuration of ROIC 302. ROIC 302 includes an imaging pixel array 404 and a pulse detection pixel array 406. The imaging pixel array 404 includes an array of image sensing circuits (e.g., image sensing circuits 104 shown in FIG. 1), and the pulse detection pixel array 406 includes an array of pulse detection circuits (e.g., pulse detection circuit 106 shown in FIG. 1).

FIG. 4 conceptually depicts the imaging pixel array 402 and the pulse detection pixel array 406 as side-by-side. However, in an implementation, the imaging pixel array 402 and pulse detection array pixel 406 are co-located, meaning that each pixel (e.g., pixel 100 shown in FIG. 1) includes a respective image sensing circuit and its corresponding pulse detection circuit. In other words, the image sensing circuits and pulse detection circuits are arranged with each respective image sensing circuit and its corresponding pulse detection circuit included in one pixel.

Additionally, each pixel includes an image readout path (e.g., image readout path 110), switches (e.g., switches 120 and 122) that control the image readout path, a pulse detection readout path (e.g., pulse readout path 112), and switches (e.g., switches 126 and 128) that control the pulse detection readout path.

The imaging pixel array 404 outputs analog image signals via image readout conductors 114. The analog image signals can be digitized by an analog to digital converter (ADC) and temporarily stored in memory by ADC/SRAM 422. The ADC/SRAM 422 outputs digitized image signals via communication path 427 to image serializers 426. The image serializers 426 serialize the stored digital image signals and transmit them out of the ROIC 302 via an imaging port of the ROIC 302. Alternatively, the analog image signals output via image readout conductors 114 can be buffered by an analog buffer (not shown), and output from the ROIC 302 via an analog buffer driver (not shown) and multiplexor (not shown).

The pulse detection pixel array 406 outputs binary or digital pulse data via pulse readout conductors 116. The pulse data is processed (as described further below) and further transmitted along communication paths 413 and 431 to pulse serializers 424, which serializes the pulse data for output from the ROIC 302 via a pulse port of the ROIC 302. Latches 428 are optionally provided along pulse readout conductors 116. The latches 428 may be used to ease timing constraints on the pulse readout path (e.g., pulse readout path 112 shown in FIG. 1) or to temporarily store the pulse data for post-processing. In embodiments, the ADC/SRAM 422 includes an ADC and a memory buffer, such as SRAM. SRAM is provided as an example but is not intended to limit the memory buffer to a particular type of memory. Other types of memory envisioned include latches, flip flops, or dynamic storage elements. The ADC and serializers can be formed of analog and/or digital components. In embodiments, the latches 428 include other means of digital memory such as flip flops or dynamic storage elements.

A main digital block 416 is provided that receives an external image exposure control signal (ext image expose) via communication path 419 and outputs image row control signals via communication path 417 to an imaging row control circuit 420. The external image exposure control signal (ext image expose) provided via communication path 419 controls the exposure window of the pixel and readout frame timing of the image readout path (e.g., image readout path 110 shown in FIG. 1). Based on the external image exposure control signal, the main digital block 416 and the imaging row control circuit 420 generate image timing control signals via communication paths 417 and 423. Imaging row control circuit 420 includes a timing controller that outputs image timing control signals via communication path 423 to the imaging pixel array 404. The imaging timing control signals include the image row select control signals (RowSelect_Image) and the image row reset control signals (Image_Reset) that respectively control the image readout paths (e.g., image readout path 110 shown in FIG. 1) for transmitting image signals (e.g., Vimage) to the corresponding readout conductor and resetting the image readout path.

Similarly, a pulse digital block 408 is provided that receives an external pulse exposure control signal (ext pulse expose) via communication path 411 and outputs pulse row control signals via communication path 409 to a pulse row control circuit 412. The external pulse exposure control signal (ext pulse expose) provided via communication path 411 controls the exposure window of the pixel and readout frame timing of the pulse readout path (e.g., pulse readout path 112 shown in FIG. 1). Based on the external pulse exposure control signal, the pulse digital block 408 and the pulse row control circuit 412 generate image timing control signals via communication paths 409 and 415.

Pulse row control circuit 412 includes a timing controller that outputs pulse timing control signals via communication path 415 to the pulse detection pixel array 406. The pulse timing control signals include the pulse row select control signals (RowSelect_Pulse) and the pulse row reset control signals (Pulse_Reset) that respectively control the pulse readout paths (e.g., pulse readout path 112 shown in FIG. 1) for transmitting pulse data (e.g., Vpulse) to the corresponding readout conductor and resetting the pulse readout path. The image row control signals are asynchronous relative to the pulse row control signals. As asynchronous signals, they are generated and output independently of one another, such that they can be output at different independent times. The independent times do not depend on the occurrence of a same event. To illustrate, image row control signals for controlling readout by image sensing circuits (e.g., image sensing circuits 104 shown in FIG. 1) of pixels disposed in a selected row of imaging pixel array 404 are asynchronous to pulse row control signals for controlling readout by the corresponding pulse detection circuits (e.g., pulse detection circuits 106) of these pixels.

The generation and output of the image row control signals and the pulse row control signals are performed independently of one another by different controllers, namely the main digital block 416 and the pulse digital block 408. For example, the image row control signals are generated and output in response to the external image exposure control signal (ext image expose), and the pulse image row control signals are generated and output in response to the external pulse exposure control signal (ext pulse expose). The external image exposure control signal (ext image expose) and the external pulse exposure control signal (ext pulse expose) are frame timing signals and are asynchronous relative to one another, meaning they may be provided by different respective devices that are external to the ROIC 302, and that there are no prescribed timing rules for when the control signals can occur relative to each other.

As such, the frame period, exposure timing, readout start time, and readout duration of data generated in the image sensing circuit 104 of the pixel 100 shown in FIG. 1 and read out of the imaging pixel array 404 on image readout conductors 114 may all be different than the frame period, exposure timing, readout start time, and readout duration of data generated in the pulse detection circuit 106 of the pixel and read out of the pulse detection pixel array on pulse readout conductors 116.

The external image exposure control signal (ext image expose) and the external pulse exposure control signal could also be generated by a timing controller on the ROIC 302 (shown in FIG. 3) or by a common device external to the ROIC 302. It is conceivable that, while there are no synchronicity requirements upon the external image exposure control signal (ext image expose) and the external pulse exposure control signal (ext pulse expose), the signals could be timed in a synchronous fashion, for example the two signals could be a common signal resulting in the same frame period and/or readout timing.

In embodiments, the pulse digital block 408 and the main digital block 416 each include, for example, control registers, counters, clock generation circuits, and other digital logic. In other embodiments, the pulse digital block 408 and the main digital block 416 may share some of these elements, including a master clock generation circuit.

In embodiments, the pulse row control circuit 412 and imaging row control circuit 420 are each timing controllers that each include, for example, control registers, counters, digital logic, delay elements, and row driver buffers.

The main digital block 416 further outputs control signals via communication path 421 to control the ADC/SRAM 422 to control sampling of the image readout conductors 114, ADC timing, and propagation of the resultant digitized output to the image serializers 426. The main digital block 416 also outputs control signals via communication path 429 to control the image serializers 426, such as to control, for example, transfer of digitized data into the image serializers 426, serialize word alignment, and start and stop of serializer readout.

Accordingly, the ROIC 302 provides asynchronous control of image and pulse readout paths in individual pixels of the focal plane array (e.g., pixels 100 of focal plane array 202 shown in FIG. 2). The image and pulse readout paths are controlled by independent, asynchronous timing controllers, imaging row control circuit 420 and pulse row control circuit 412. The image signals and pulse data are output via respective data channels (image serializers 426 and pulse serializers 424, each having respective communication paths that are independent from one another) and output from the ROIC 302 through different ports.

In particular, the image signals are transmitted via image readout paths (e.g., image readout paths 110 shown in FIG. 1) to image readout conductors 114 to ADC/SRAM 422, and then to image serializers 426 via communication path 427, and output via the imaging port of the ROIC 302. The pulse data is transmitted independently of the image signals via pulse readout paths (e.g., pulse readout paths 112 shown in FIG. 1) to pulse readout conductors 116 to pulse digital block 408, and then to main digital block 416 via communication path 413, followed by pulse serializers 424 via communication path 431, and output via the pulse port of the ROIC 302.

Note that in the example shown, main digital block 416 processes and outputs the pulse data to the pulse serializers 424 independently of processing and output of signals related to the data channel of the image signals, namely the signals output to the ADC/SRAM 422 and the image serializers 426. In an embodiment, the main digital block 416 can be eliminated from the pulse data channel, wherein the pulse data is provided directly by the pulse digital block 408 to the pulse serializers 424, without passing through the main digital block 416.

By providing different control signals to the image serializers 426 and the pulse serializers 424 provides independent control of serialization and formatting of the pulse data and the image signals serialized data interface can be formatted for serialization differently and independently.

Figure 5:
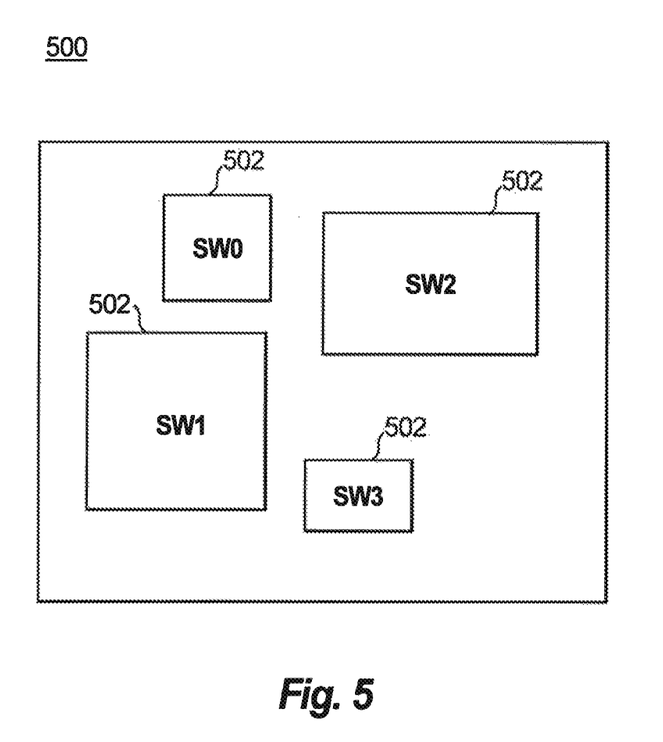
FIG. 5 is a schematic diagram of an image window and pulse sub-windows output by a readout integrated circuit in accordance with embodiments of the present disclosure.

FIG. 5 illustrates image and pulse windows output by the ROIC (e.g., ROIC 302), including an image window 500 and multiple pulse sub-windows 502. A variety of window sizes and readout frame rates in enabled by independent control of the readout paths associated with the image signals and the pulse data. Each window can have independently controlled frame rates.

The pulse data can be read out of each pixel (e.g., pixel 100 in FIG. 1) faster than image signals since the binary or digital pulse data can be faster to process and transmit than analog image signals having voltage levels that need to settle and/or be converted to digital values using the ADC/SRAM 422. For example, while an imaging frame rate may be set at 60 Hz to accommodate voltage settling and ADC, the pulse detection frame rate can be set at a faster rate, such as 1000 Hz. This allows for high sensitivity and full integration time for imaging operations with a full field of view, while simultaneously providing high temporal resolution with the ability to determine arrival time of laser pulses in the pulse data for identification of pulse repetition frequency and pulse codes in the pulse data.

The pixel image signals can be addressed and controlled to be read out as a single image window having a frame rate that is suitable for imaging (e.g., 60 Hz). The image window can include a full set of pixels of the focal plane array, providing a full field of view. In embodiments, the image signals can be addressed so that the image window can include a subset (wherein the term subset refers herein to a proper subset) of pixels of the focal plane array, providing a partial field of view. In embodiments, the image window can include multiple sub-windows, each corresponding to a different set of addressed pixel image signals, providing multiple, different, partial fields of view.

Regardless of whether image window is full or partial, or includes sub-windows, the pulse data can include multiple pulse sub-windows, each corresponding to a different set of addressed pixel pulse data that is controlled to be readout as a different pulse sub-window. The pulse sub-windows can be addressed, controlled, and read out concurrently. In embodiments, each pulse sub-window can be read out at a unique frame rate. In other embodiments, the pulse sub-windows are all read out at the same frame rate. The pulse detection sub-window frames rates can be significantly higher than the frame rate used for the image window.

In the example shown in FIG. 5, an example image window 500 includes 640×512 pixels with a 60 Hz frame rate; the first pulse window 502, labeled SW0, includes first set of 32×32 pixels with a 1.0 kHz frame rate; the second pulse window 502, labeled SW1, includes a first set of 64×64 pixels with a 1.0 kHz frame rate; the third pulse window 502, labeled SW2, includes a second set of 64×64 pixels different than the first set with a 1.0 kHz frame rate; and the fourth pulse window 502, labeled SW3, includes a second set of 32×32 pixels, different than the first set, with a 1.0 kHz Hz frame rate. Although the sub-windows 502 are mutually exclusive, they can be addressed to overlap so that some pixels are included in more than one sub-window.

The image frame rate is determined by the external image exposure control signal (ext image expose), which triggers the start of each image frame. The pulse frame rate for a full pulse window is determined by the external pulse exposure control signal (ext pulse expose), which triggers the start of each pulse frame. Since the external pulse and image control signals are asynchronous relative to one another, the image and pulse windows can have different addressing and frame rates.

In embodiments, the pulse windows 502 can each have different frame rates, e.g., SW0 having a 60 Hz frame rate, SW1 having a 1 kHz frame rate, SW2 having a 1.5 kHz frame rate, and SW3 having a of 10 kHz frame rate. The total frame readout time of the sub-windows must be equal to or less than the overall frame readout time for a full pulse window. The pulse digital block 408 can address the pulse sub-windows 502 and adjust the frame rate for each sub-window 502 by outputting additional pulses to the pulse serializers 424 to output each sub-window 502. In embodiments, the pulse digital block 408 can include a control register that can be adjusted to set the frame rate.

The ability to provide multiple sub-windows at an increased frame rate relative to imaging frame rates provides increased temporal resolution in the arrival time of laser pulses. This enhances the ability to detect and decode pulses from multiple laser designator sources that designate multiple targets within a full field of view of an image sensor. For example, while reading out the full field of view window at a first frame rate, pulse data can be detected for laser signals output by four different laser designator sources at four different X-Y coordinates. Pulse data sub-windows containing the X-Y coordinates can then be used to read out the pulse data at a second increased frame rate, achieving an improved time of arrival resolution to enable precise repetition frequency decoding. Decoding is attainable for repetition periods of the laser designators pulses of 1-21 Hz. In embodiments, decoding is attainable for repetition period accuracy of better than 80 us. Additionally, using sub-windows and independent frame rates for image and pulse data, pulses can be accurately detected over a full field of view and decoded with the same temporal resolution for image sensor pixel arrays having different resolutions, such as 640×512 pixels, 1280×1012 pixels, or 1920×1200 pixels.

The methods and systems of the present disclosure, as described above and shown in the drawings, provide for multimode pixels that provide for independent readout of image signals and pulse data. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A readout integrated circuit (ROTC) comprising:
   an image readout conductor;
   a pulse readout conductor that is independent of the image readout conductor;
   an array of readout circuits, each readout circuit associated with a respective pixel of a pixel array, each pixel having a photodetector,
   wherein each readout circuit comprises:
   an image sensing circuit;
   an image readout path coupled between the pixel's image sensing circuit and the image readout conductor to transmit image signals from the image sensing circuit to the image readout conductor;
   a pulse detection circuit; and
   a pulse readout path that is independent of the image readout path, the pulse readout path being coupled between the pixel's pulse detection circuit and the pulse readout conductor to transmit pulse data from the pulse detection circuit to the pulse readout conductor;
   an image controller that outputs an image control signal that controls the image readout path; and
   a pulse controller that outputs a pulse control signal different from the image control signal that controls the pulse readout path,
   wherein the pulse controller further selects at least one subset of the pulse data output by the pulse detection circuit to be transmitted to the pulse readout conductor, each subset being included in a respective pulse detection sub-window,
   wherein the pulse controller further controls a first frame rate at which a first pulse detection sub-window is output to the pulse readout conductor and a second frame rate, different than the first frame rate, at which a second pulse detection sub-window is output to the pulse readout conductor.

2. The ROIC of claim 1, wherein timing associated with output of the image and pulse control signals is independent of one another.

3. The ROIC of claim 1, wherein the image control signal and the pulse control signal include, respectively, at least one of: (a) an image row select signal that enables readout along the image readout path and a pulse row select signal that enables readout along the pulse readout path, and (b) an image reset signal that resets the image sensing circuit and a pulse reset signal that resets the pulse detection circuit.

4. The ROIC of claim 1, wherein the image signals transmitted to the image readout conductor are analog signals, and the pulse data transmitted to the pulse readout conductor are at least one of binary and digital.

5. The ROIC of claim 1, wherein:
   the image controller further controls a first frame rate at which the image signals are output to the image readout conductor, and
   the pulse controller further controls a second frame rate at which the pulse data are output to the pulse readout conductor, wherein the pulse controller controls the second frame rate asynchronously from the image controller controlling the first frame rate.

6. A method of controlling image signal and pulse data readout from a readout integrated circuit (ROIC), the method comprising:
controlling transmission of image signals from individual pixels of a pixel array to at least one readout conductor;
controlling, asynchronously to transmission of the image signals, transmission of pulse data from the individual pixels of the pixel array to the at least one readout conductor;
selecting at least one subset of the pulse data output by the pixel array to be transmitted to the at least one readout conductor, wherein each subset is included in a respective pulse detection sub-window; and
controlling a first frame rate at which a first pulse detection sub-window is output to the at least one readout conductor and a second frame rate, different than the first frame rate, at which a second pulse detection sub-window is output to the at least one readout conductor.

7. The method of claim 6, wherein controlling transmission of the image signals includes controlling transmission of the image signals along individual image readout paths between respective image sensing circuits of the pixel array and the at least one readout conductor, and controlling transmission of the pulse data includes controlling transmission of the pulse data along individual pulse readout paths between respective pulse detection circuits of the pixel array and the at least one readout conductor.

8. The method of claim 6, further comprising:
controlling a first frame rate at which the image signals are output to the at least one readout conductor; and
controlling a second frame rate at which the pulse data are output to the at least one readout conductor, the second frame rate being controlled asynchronously from controlling the first frame.

9. The method of claim 6, wherein the pulse data transmitted to the at least one readout conductor are at least one of binary and digital.

10. A readout integrated circuit (ROIC) comprising:
an image readout conductor;
a pulse readout conductor that is independent of the image readout conductor;
an array of readout circuits, each readout circuit associated with a respective pixel of a pixel array, each pixel having a photodetector,
wherein each readout circuit comprises:
an image sensing circuit;
an image readout path coupled between the pixel's image sensing circuit and the image readout conductor to transmit image signals from the image sensing circuit to the image readout conductor;
a pulse detection circuit; and
a pulse readout path that is independent of the image readout path, the pulse readout path being coupled between the pixel's pulse detection circuit and the pulse readout conductor to transmit pulse data from the pulse detection circuit to the pulse readout conductor;
an image controller that outputs an image control signal that controls the image readout path; and
a pulse controller that outputs a pulse control signal different from the image control signal that controls the pulse readout path,
wherein the image controller receives an image exposure control signal that controls framing of the image signals, and the pulse controller receives a pulse exposure control signal that controls framing of the pulse data, the image and pulse exposure control signals being received from different sources and timed independently of one another.

* * * * *